3,125,497
PURIFICATION PROCESS FOR URANIUM CARBIDE
Wilford N. Hansen, Canoga Park, Calif., assignor, by mesne assignments, to the United States of America as represented by the United States Atomic Energy Commission
No Drawing. Filed Dec. 15, 1961, Ser. No. 159,764
11 Claims. (Cl. 204—1.5)

My invention relates to a process for the purification of uranium carbide, in which uranium values are recovered and more particularly to an electrolytic process for the decontamination of neutron-irradiated uranium carbide from fission products and the re-formation of uranium carbide.

Uranium monocarbide (UC) is acquiring increased interest and importance as a nuclear reactor fuel. Uranium carbide has excellent thermal and dimensional stability at high temperatures and neutron fluxes, and is capable of extended burnup before reprocessing. Further, unlike other ceramic fuels such as $UO_2$, it has very good thermal conductivity, approaching that of the metallic fuel compositions. The development of a reprocessing cycle for uranium carbide which is economical and convenient, and which achieves high decontamination from fission products is therefore of considerable importance.

The principal object of my invention, therefore, is to provide a process for the purification of uranium carbide.

Another object is to provide a process for the purification of neutron-irradiated uranium carbide which achieves high purification in a convenient and economical manner.

Another object is to provide a process for the decontamination of neutron-irradiated uranium carbide wherein stoichiometric uranium monocarbide is re-formed.

Still another object is to provide a process for the purification of uranium carbide, which includes a relatively low temperature electrolytic dissolution step.

Still another object is to provide a method for the formation of uranium carbide from uranium metal.

Other objects and advantages of my invention will become apparent from the following detailed description and the appended claims.

In accordance with my present invention, uranium carbide may be purified by electrolyzing the uranium carbide in a cell having a fused halide salt electrolyte. Uranium metal forms at the cathode as a dendritic mass. The cathode deposit with occluded salt is then immersed in hot mercury; the uranium reacts with the mercury to form a quasi-amalgam reaction product which separates from the salt and other impurities. The uranium may also be electrolyzed directly into a mercury cathode. The formation of the quasi-amalgam phase, i.e., a phase consisting of mercury with uranium mercuride dispersed therethrough, has the important advantage that the uranium forms a fluid metal phase which separates from the salt and other phases not soluble in mercury. The uranium is then easily separated from the quasi-amalgam as the metal, or mercury-free uranium carbide may be formed by heating the amalgam in an atmosphere of hydrocarbon gas. Excellent decontamination of uranium from impurities and fission products is readily and conveniently accomplished, and stoichiometric UC is formed by reaction of the quasi-amalgam with the hydrocarbon gas.

I find that uranium carbide can be anodically dissolved in a molten fused salt bath, and the uranium deposited on a metal cathode. The fused UC retains its form and dissolves in the manner of a metal, the U going into solution and the C dispersing in the bath. The electrolyte comprises at least one alkali metal halide or alkaline earth metal halide, and is chosen because of its stability. If the salt were not stable to oxidation, it would be decomposed at the anode when reasonable current densities were employed, making dissolution of uranium carbide difficult. If the salt were unstable to reduction, it would be impossible to deposit uranium metal from the bath. While any of the halide salts may be used satisfactorily, the chlorides are especially useful due to their relatively low cost, availability, and stability. The bromides have lower melting points, and the use of such salts might be advantageous when employing a liquid mercury cathode. Mixtures of the salts are relatively lower melting and are therefore preferred. The KCl—LiCl eutectic is especially useful because of its stability and melting point of 352° C., which is below the boiling point of mercury. A uranium halide, such as $UF_4$, $UBr_4$, or $UCl_3$, is added to the electrolyte to prevent deposition of alkali or alkaline earth metals. The melting point of the resulting composition remains below the boiling point of mercury.

The low melting feature of the electrolyte has significance in the later mercury separation step. It means that salt which is occluded in the uranium cathode deposit will readily melt to expose the dendritic uranium in the near-boiling mercury. However, if a higher melting halide salt composition is employed, such is still operable since a molten halide salt cover may be provided over the hot mercury, and such molten salt would then dissolve the occluded salt.

The halide salt electrolyte must be pure, and in practice is purified by melting in a stream of dry halogen gas. The uranium salt is then added as $UF_4$ or $UCl_3$, or is added earlier and purified together with the solvent. Both procedures are satisfactory, although experiments indicate that the latter procedure leads to better current efficiencies.

The concentration of uranium salt that must be contained in the bath varies with such factors as temperature, composition, and stirring. Generally, about 5–15 weight percent is satisfactory; it is preferred to use low concentrations in this range to maintain a low melting point and reduce the uranium inventory. For example, with a bath of KCl–LiCl–6 weight percent $UF_4$, electrolysis has been successfully carried out at a current density of 3 amps per $cm.^2$ (based on initial cathode area). At theoretical current efficiency, about 3 grams uranium per amp hr. is deposited. Actual current efficiencies are about 50–60 percent on small-scale runs, and are expected to be higher in large-scale runs. The table below gives the current efficiencies obtained in several representative small-scale runs.

TABLE I

| Run | Total wt. of Deposit, g. | Wt. of U, g. | Amp. Hrs. | Efficiency, percent |
|---|---|---|---|---|
| 1 | 41.0 | 9.0 | 5.0 | 60 |
| 2 | 47.5 | 11.1 | 6.7 | 56 |
| 3 | 29.9 | 7.6 | 5.0 | 51 |

I find that improved uranium deposition on the cathode can be obtained by stirring the bath, by such means as bubbling an inert gas, for instance helium, therethrough, resulting in a good deposit of uranium having large crystals. If the bath is allowed to remain quiet, the nature of the deposit changes, with smaller non-adhering crystals being formed and the deposit taking on an appearance indicative of alkali metal deposition.

The electrolysis should be conducted in an inert gas atmosphere and the salt bath maintained oxygen and water-free. The inert gas atmosphere in which the electrolysis is conducted may be provided by a noble gas, such as argon. The electrolysis is conducted at a temperature above the melting point of the electrolyte composition at which the composition is fluid. For example, with the KCl–LiCl eutectic with $UF_4$, a temperature of about 400° C. is adequate. Temperatures may generally range from about 400° C. to 600° C. However, if direct electrolysis into a mercury cathode is utilized, the salt near the cathode must be maintained below the boiling point of mercury, which is about 360° C. at atmospheric pressure.

The uranium carbide is positioned at the anode in the cell. The carbide may conveniently be in various forms, for example as small wafers cut from a rod of fused and cast UC. Contact between the UC and the current source may be made in a number of ways. For example, a molybdenum wire may be used to support a single wafer of UC, and shaped to grip the wafer by spring tension. A particularly convenient method is to place pieces of UC into a graphite crucible or on a graphite plate which is connected with the power source. Electrical contact with the UC can be improved by serrating the face of the graphite in contact with the UC.

Uranium carbide is found to dissolve readily, whereas graphite is anodically inert. The anode reaction is:

$$UC = U^{+3} + C + 3e^-$$

The resulting carbon is dispersed uniformly throughout the bath in a very finely divided state. It creates no problems in the electrolysis, but if its concentration became large after many cycles, it could easily be filtered out of a side stream. Carbon may be of benefit, however, in absorbing fission products, and thus increasing overall decontamination factors.

The cathode, in addition to being strong and a good electrical conductor, should be inert toward the salt bath, provide a surface to which the uranium will stick, and be inert toward the hot mercury into which it will be immersed to dissolve the dendritic uranium deposit. A number of inert cathode metals meet these requirements, such as tungsten, tantalum, nickel, and uranium itself. Molybdenum is found to be particularly satisfactory. The free energy of formation of the most stable chloride of molybednum is a small number and, therefore, molybdenum is stable toward the halide bath. The uranium deposit adheres well and the hot mercury does not attack the molybdenum.

The shape of the cathode may satisfactorily vary, for instance, a rod form has been used in experiments. Other shapes are satisfactory for removal of large deposits, for example three rods with ends at the corner of a triangle, or a section of a tube. Adherence between the uranium and the cathode is improved by cleaning the cathode, by conventional means, before positioning it in the cell.

Particularly for larger scale operation, the uranium may be directly electrolyzed into a mercury cathode, thereby eliminating one step in the process. Mercury cathodes are known to the art for other uses and, in the present process, such a cathode may be established in a separate half cell, or in the same cell as the anode, for instance as a pool positioned below the electrolyte, the mercury being heavier than the salt.

After deposition of the uranium on the cathode is complete, which may be determined by the ampere-hours of electricity consumed or by visual inspection (the electrolysis reduces green $UF_4$ to red $UF_3$), it is ready for dissolution in the mercury to separate occluded salt and to obtain further purification and decontamination from fission products. The cathode deposit is first lifted out of the heated electrolytic cell into a cooled section containing inert gas.

After cooling, the deposit is transferred to the mercury container. Since fused salt covers the uranium deposit, protecting it from the atmosphere, the deposit can be transferred in air to the mercury container. However, since the salt is hydroscopic, transfers in air should be made quickly to avoid contamination by water. Such problems are not present in hot cell operation in an inert atmosphere. The uranium deposit and the occluded salt are immersed in mercury heated above the melting point of the salt and below the boiling point of mercury. Upon heating of the mercury, the salt melts rapidly and establishes a second, lighter phase on top of the mercury; the uranium rapidly forms a quasi-amalgam, probably by formation of $UHg_4$ in Hg. A layer of the electrolyte salt (minus the uranium) may be initially provided over the mercury to promote separation of the uranium from occluded salts. Such extraction is particularly helpful when the occluded salt melts above the boiling point of mercury. Separation of the resulting amalgam phase from the salt phase can be readily accomplished. For example, the amalgm may be separated by bottom decantation, or by filtration in a filter paper cone with a small hole at the apex; amalgam will drain through and the salt will remain behind.

Uranium values may be recovered from the quasi-amalgam and still further purification accomplished by a number of methods, depending upon whether uranium metal or uranium carbide is desired as the final product. For example, the mercury can be separated by distillation. I find that separation of the mercury and re-formation of stoichiometric uranium carbide may be accomplished by distillation of the mercury in an atmosphere of hydrocarbon gas. Any relatively light hydrocarbon gas may be used, for example methane, ethane, propane, and pentane. Dry oxygen-free natural gas is perfectly satisfactory. The conversion of uranium in the colloidally dispersed uranium mercuride to uranium monocarbide is apparently according to the following (unbalanced) reaction:

$$UHg_4 + C_mH_n \rightarrow UC + Hg + H_2$$

When the mercury is hot there is an appreciable amount of uranium in true solution. The formation of UC may be by reaction of dissolved uranium with subsequent decomposition of some $UHg_4$ to maintain equilibrium. The distillation temperature is at least about 400° C. (at atmospheric pressure), while I find that heating in a natural gas atmosphere at about 500–600° C. is very satisfactory. The resulting UC is stoichiometric, and excellent decontamination and purification is obtained.

It should be noted that mercury dissolution of uranium, followed by hydrocarbon gas treatment, may be employed, apart from a decontamination process, for the formation of stoichiometric UC from uranium metal. The formation of stoichiometric UC has been one of the problems in development of uranium carbide fuel elements. Stoichiometry affects the integrity of the fuel element; for example, in hyper stoichiometric compositions, carburization occurs with consequent weakening of stainless steel cladding metal as a result of its reaction with the excess carbon.

The following examples are offered to illustrate my invention is greater detail.

*Example 1*

An electrolytic cell was positioned in a Pyrex tube containing an argon atmosphere and sealed with a rubber stopper. The tube had gas inlet and exit tubes attached, and electrical leads passing through. The cathode comprised a ¼ inch molybdenum rod which would be replaced by another after build up of a uranium and salt deposit and the electrolysis continued. The anode comprised a graphite rod with a flat graphite plate attached normally at its end for the purpose of holding uranium carbide wafers. To insure good electrical contact between the UC discs and the graphite, slits were machined in the graphite holder of such size as to hold the wafer edge tight when forced into the slot. The lower portion of the Pyrex tube containing the cell assembly was positioned in a packed furnace.

Three hundred grams of KCl–LiCl, purified by passage of chlorine therethrough, and 20 grams $UF_4$ were added as the electrolyte to the cell. 105 grams of UC, in the form of four wafers, each about 2 cm. x 0.6 cm., were placed on the graphite holder. The bath was maintained at a temperature of about 500° C. during electrolysis. While stirring the electrolyte by passing argon therethrough, the current was initially set at 2.0 amps and allowed to continue ¾ hour or 1½ amp hours. The deposit consisted of many whiskers, some extending about ⅜ inch into the melt from the main deposit. The current was then adjusted to 5 amps, and after 20 minutes the cathode was removed and examined, revealing the deposition of larger crystals. The projections were removed by rotating the deposit against the sides of a crucible, the cathode reinserted in the cell, and the electrolysis continued. The maximum current employed was 10 amps, and the total amp hours until the cathode was changed was ten.

The cathode was removed from the electrolytic cell and rapidly transferred in air to a long Pyrex tube containing a mercury bath, the portion of the cathode containing the deposit being inserted in the bath. This assembly was heated to a temperature of about 360° C., with the result that the occluded salt rapidly separated into a separate phase and a quasi-amalgam of uranium mercuride formed, the mercuride being dispersed as tiny particles throughout the mercury bath. The salt was then separated from the quasi-amalgam by careful decantation. Uranium metal was recovered by first filtering the quasi-amalgam which separated the $UHg_4$ from the mercury. The $UHg_4$ was subjected to distillation with dry propane at a temperature which reached 550° C. The mercury was driven off, leaving the uranium carbide product. X-ray diffraction revealed no phases other than UC.

*Example II*

The apparatus described in Example I was employed. About 10 grams of tracer irradiated UC and 90 grams of unirradiated UC were electrolyzed in the molten bath containing 250 grams of KCl–LiCl–10 weight percent $UF_4$. A total of 6 cathode deposits were saved from runs conducted at currents of ca. 4 amps for ca. 1 hour or ca. 4 amp hours total. The dendritic deposit from each run with its occluded salt was placed in a Pyrex test tube. A rubber stopper on the molybdenum rod sealed the contents of the test tube from the atmosphere. The mercury was heated by a tube furnace and the salt observed to melt at a temperature just below the boiling point of mercury. The dentritic deposit quickly dissolved in the boiling Hg.

The separation of the metallic phase from the salt phase was carried out by placing the mixture in a filter paper cone with a small hole at the apex, with amalgam draining through and the salt remaining behind. The mercury and uranium were then separated by distillation in a dry natural gas atmosphere at 600° C., with uranium carbide being formed and left behind. Later X-ray analysis indicated the uranium carbide to be stoichiometric uranium monocarbide. Radiochemical analysis revealed thorough decontamination of the uranium carbide from fission products, as shown in the following Table II which lists observed decontamination factors.

TABLE II

| Run | Ba | Sr | Rare Earths | Ce | Ru [1] | Zr [1] |
|---|---|---|---|---|---|---|
| 1 | $2.1 \times 10^3$ | $7.0 \times 10^3$ | $1.1 \times 10^3$ | 85 | | 2 |
| 2 | $2.0 \times 10^3$ | $6.7 \times 10^3$ | $5.9 \times 10^2$ | 65 | | 2 |
| 3 | $3.3 \times 10^3$ | $5.4 \times 10^3$ | $4.1 \times 10^2$ | 53 | $6.0 \times 10^2$ | 2 |
| 4 | $5.8 \times 10^2$ | | $5.6 \times 10^2$ | 58 | | 6 |
| 5 | $2.0 \times 10^3$ | $3.0 \times 10^3$ | $8.5 \times 10^2$ | 86 | $8.0 \times 10^2$ | 4 |
| 6 | $4.2 \times 10^3$ | $5.2 \times 10^3$ | $4.3 \times 10^2$ | 51 | $1.1 \times 10^3$ | 6 |

[1] Overall decontamination factors at one throughput are given for Ru and Zr.

The factors shown in the table above, except for Ru and Zr, indicate decontamination observed in going from the salt bath phase to uranium carbide powder, the final product. Overall decontamination factors at one throughput can be greater but never less than these values.

*Example III*

This example discloses a method for the formation of UC from uranium metal. A 10 gram piece of uranium was hydrided in a round bottomed Pyrex flask, then dehydrided by heating to ca. 550° C. in a stream of argon, in order to pulverize the solid piece of uranium metal and make it more reactive with mercury. 190 grams of mercury were added and a quasi-amalgam was formed by heating to ca. 350° C. in an argon atmosphere. Dried propane was then admitted, the temperature gradually raised, and the mercury boiled off.

There was evidence of significant reaction between the propane and quasi-amalgam below the boiling point of mercury. In this experiment, however, the extent of UC formation before removal of mercury was not determined.

After the mercury had boiled off, the temperature increased rapidly and was maintained at ca. 550° C. for two hours. After cooling, the flask was transferred to a dry box, and samples were loaded into capillary tubes for X-ray diffraction analysis.

X-ray diffraction revealed pure UC, i.e., no trace of other phases such as U, $UC_2$, $UO_2$, etc., was observed. X-ray fluorescence revealed no residual mercury.

The above examples are illustrative rather than restrictive of my invention. The invention should be understood to be limited, therefore, only as is indicated in the appended claims.

I claim:

1. A method of purifying uranium carbide in which uranium values are recovered which comprises electrolyzing uranium carbide under an inert gas atmosphere in an electrolytic cell having as its electrolyte a molten composition consisting essentially of a uranium halide and at least one halide salt selected from the group consisting of alkali metal and alkaline earth metal halides to form a cathode deposit containing uranium values forming a uranium quasi-amalgam reaction product of said cathode deposit and mercury, and thereafter recovering the uranium values from said quasi amalgam.

2. The method of claim 1 wherein the uranium values are recovered as uranium monocarbide by distilling the quasi-amalgam in a hydrocarbon gas atmosphere to remove the mercury and form uranium carbide.

3. A method of purifying uranium carbide which comprises electrolyzing uranium carbide under an inert gas atmosphere in an electrolytic cell having a mercury cathode and containing a molten electrolyte consisting essentially of at least one alkali metal halide and a uranium halide, to form a cathode deposit containing uranium values and reactive with said mercury cathode whereby a uranium quasi-amalgam reaction product of said cathode deposit and mercury is formed; separating the resulting uranium quasi-amalgam-reaction product from the salt electrolyte; and distilling the separated quasi-amalgam in a hydrocarbon gas atmosphere to remove the mercury and recover the uranium as uranium carbide.

4. A method of purifying uranium carbide which comprises providing an electrolytic cell containing: a molten electrolyte consisting essentially of a uranium halide and at least one alkali metal halide, uranium carbide in electrical contact with the anode, a mercury cathode, and an inert gas atmosphere cover; electrolyzing said uranium carbide to form a cathode deposit containing uranium values and reactive with said mercury cathode whereby a uranium quasi-amalgam reaction product of said cathode deposit and mercury is formed; separating the resulting uranium quasi-amalgam from the electrolyte; and thereafter heating the separated quasi-amalgam in a hydrocarbon gas atmosphere at a temperature of about 400–600° C. to remove the mercury and recover the uranium as stoichiometric uranium monocarbide.

5. A method of purifying uranium carbide to recover uranium therefrom which comprises providing an electrolytic cell containing: an electrolyte comprising a uranium halide and at least one halide salt selected from the group consisting of alkali metal and alkaline earth metal halides, uranium carbide in electrical contact with the anode, an inert metal cathode, and an inert gas atmosphere cover; electrolyzing said uranium carbide to form a cathode deposit containing uranium and fused salt, dissolving said deposit in a mercury bath, thereby separating the uranium from the salt; and thereafter recovering the uranium from the mercury.

6. The method of claim 5 wherein the uranium is recovered from the mercury and converted to stoichiometric uranium monocarbide by distilling said uranium-containing mercury with a hydrocarbon gas.

7. A method for the decontamination of neutron irradiated uranium carbide which comprises providing an electrolytic cell containing: an inert anode with said irradiated uranium carbide in electrical contact therewith, an inert metal cathode, a molten fused salt electrolyte consisting essentially of a uranium halide and at least one halide salt selected from the class consisting of alkali metal and alkaline earth metal halides, and an inert gas atmosphere; electrolyzing said uranium carbide to form a cathode deposit containing uranium values; removing the resulting cathode deposit from the electrolytic cell and dissolving said deposit in a mercury bath to form a salt phase and a quasi-amalgam phase containing said uranium; separating said phases; and then distilling the separated quasi-amalgam in a hydrocarbon gas atmosphere to remove the mercury and recover the uranium as uranium carbide.

8. The method of claim 7 wherein said hydrocarbon gas is dry oxygen-free natural gas and said distillation is conducted at a temperature of a least about 400° C.

9. The method of claim 7 wherein said halide salt is LiCl-KCl.

10. A method of decontaminating neutron irradiated uranium carbide which comprises providing an electrolytic cell containing: a graphite anode having said irradiated uranium carbide disposed in electrical contact therewith, a molybdenum cathode, a molten fused salt electrolyte bath comprising LiCl-KCl-UF$_4$, and an inert gas atmosphere; electrolyzing said uranium onto said cathode; removing said cathode containing dendritic deposits of uranium and occluded salts from said cell; dissolving said dendritic deposits in a mercury bath provided with an inert gas atmosphere, thereby producing a mercury phase with uranium mercuride dispersed therethrough and a discrete salt phase; separating the resulting phases; and then recovering uranium as uranium carbide by distilling the separated mercury phase in a natural gas atmosphere at a temperature of about 400-600° C.

11. The method of claim 10 wherein said electrolyte salt bath contains approximately 5-15 weight percent UF$_4$, and is maintained at a temperature of about 400-600° C. during electrolysis.

References Cited in the file of this patent

UNITED STATES PATENTS

| | | |
|---|---|---|
| 2,580,349 | Fisher | Dec. 25, 1951 |
| 2,781,304 | Wihelm et al. | Feb. 12, 1957 |
| 2,994,650 | Slatin | Aug. 1, 1961 |
| 3,029,193 | Dean | Apr. 10, 1962 |
| 3,046,090 | Powers | July 24, 1962 |
| 3,070,420 | White | Dec. 25, 1962 |